Mar. 13, 1923.

D. W. RIPLEY 1,448,237

WEIGHING AND PACKING APPARATUS

Filed Jan. 13, 1921

INVENTOR
David W Ripley
BY
Miller & Henry
ATTORNEYS

Mar. 13, 1923.

D. W. RIPLEY 1,448,237

WEIGHING AND PACKING APPARATUS

Filed Jan. 13, 1921

INVENTOR
David W Ripley
BY
Miller & Henry
ATTORNEYS

Mar. 13, 1923.

D. W. RIPLEY 1,448,237

WEIGHING AND PACKING APPARATUS

Filed Jan. 13, 1921 5-sheets-sheet 4

INVENTOR
David W Ripley
BY
Miller & Henry
ATTORNEYS

Mar. 13, 1923.

D. W. RIPLEY

1,448,237

WEIGHING AND PACKING APPARATUS

Filed Jan. 13, 1921

INVENTOR
David W Ripley
BY
Miller & Henry
ATTORNEYS

Patented Mar. 13, 1923.

1,448,237

UNITED STATES PATENT OFFICE.

DAVID W. RIPLEY, OF FRESNO, CALIFORNIA, ASSIGNOR OF ONE-THIRD TO THOMAS B. HUNTER, OF SAN FRANCISCO, CALIFORNIA, AND ONE-THIRD TO GUY B. McLEAN, OF FRESNO, CALIFORNIA.

WEIGHING AND PACKING APPARATUS.

Application filed January 13, 1921. Serial No. 437,078.

*To all whom it may concern:*

Be it known that I, DAVID W. RIPLEY, a citizen of the United States, and resident of Fresno, Fresno County, California, have invented new and useful Improvements in Weighing and Packing Apparatus.

My invention has for its principal object apparatus by which material to be packed into boxes, cartons or other suitable containers is automatically weighed into said container with great accuracy and thereafter the filled and weighed container is automatically discharged and the apparatus restores itself into condition for receiving further containers to be filled.

My apparatus is particularly adapted to the weighing and packing in cartons of raisins or dried fruits but may be used for other purposes as will appear from the specifications and drawings which follow. It is also particularly adapted to the weighing and packing of products or materials in a package containing a large number of units of said material as raisins, dried fruits or the like. These objects I accomplish by:

Mechanism provided with a charging device associated with scale means adapted to support the container and comprising a plurality of picking devices by which material is then rapidly fed into the carton or container until the contents of the said container is brought nearly to a predetermined weight when a part of the feeding mechanism is then cut out, leaving a portion of the feeding or picking mechanism still adding material to the container to make up the last increment of weight and to bring the container to an accurate predetermined weight. When this predetermined weight is reached the portion of the picking mechanism still operating is automatically tripped out of action; and discharge means are then actuated by which the packed container or containers are cleared from the scales. The discharge means distributes the packed cartons or packages on to a transfer mechanism by which they are conveyed to any desired point.

I also provide a receiving table on which any excess material which may be diverted from the feeding means and away from the containers is returned again through the feeding means to be thereafter packed. In that operation of my apparatus which directs the material into the containers on the scales I employ, as stated above, a plurality of picking devices all of which are adapted to pick up material from a source of supply and deliver it into the container and when the said container is nearly filled the greater part of this charging is automatically interrupted. Thereafter but a part of the picking mechanism continues to transfer material from the source of supply into the cartons only until the exact required amount is reached and as indicated by a movement of the scale. This scale movement actuates means which automatically cause the last action of the feeding mechanism to be discontinued. In this way a package is obtained of the correct weight with the greatest degree of accuracy and speed.

After the container has been filled to its accurate weight the movement of the scale and the tripping out action of the filling mechanism are followed by the movement of automatic discharging mechanism by which the container is removed clear from the scales and the apparatus is then furnished with further containers to be packed.

By referring to the accompanying drawings and specifications my invention will be made clear.

Referring to the accompanying drawings.

Figures 1, 2, 3:
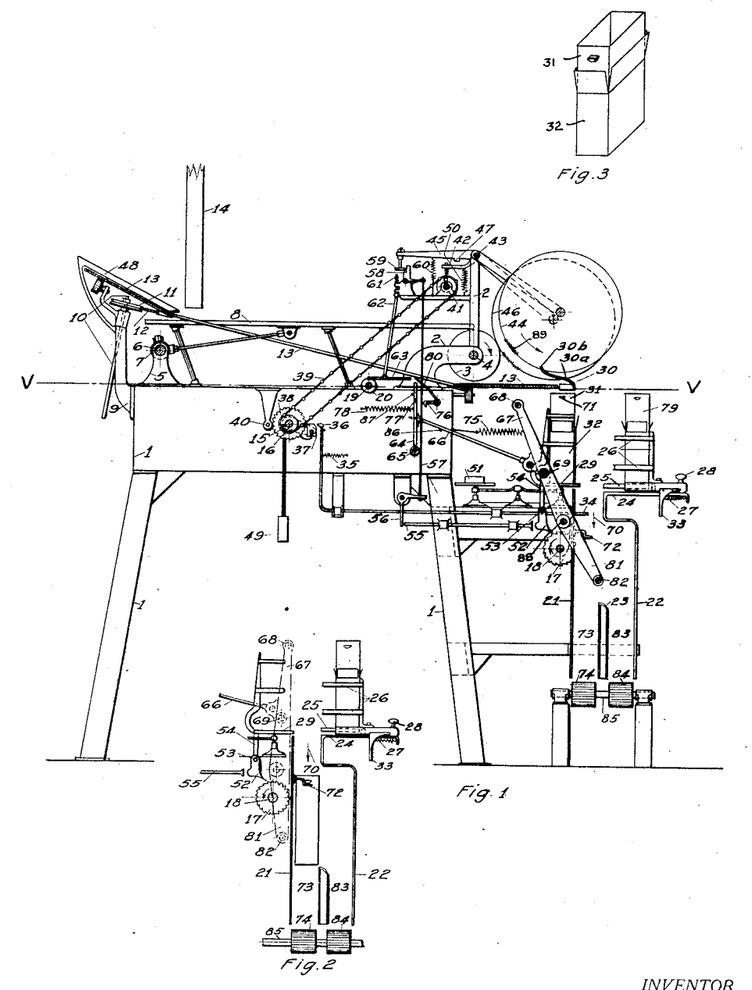
Fig. 1 is a side elevation of the machine of my invention as especially adapted to the weighing and packing of cartons of raisins and in which some of the parts are shown diagrammatically.
Fig. 2 shows a detail of Fig. 1 wherein the discharge means is shown in the position it occupies just after it has cleared the scale platform of a packed and weighed container.
Fig. 3 is a perspective view of a carton and its funnel in position ready to be placed in the machine for packing.
Figure 4:
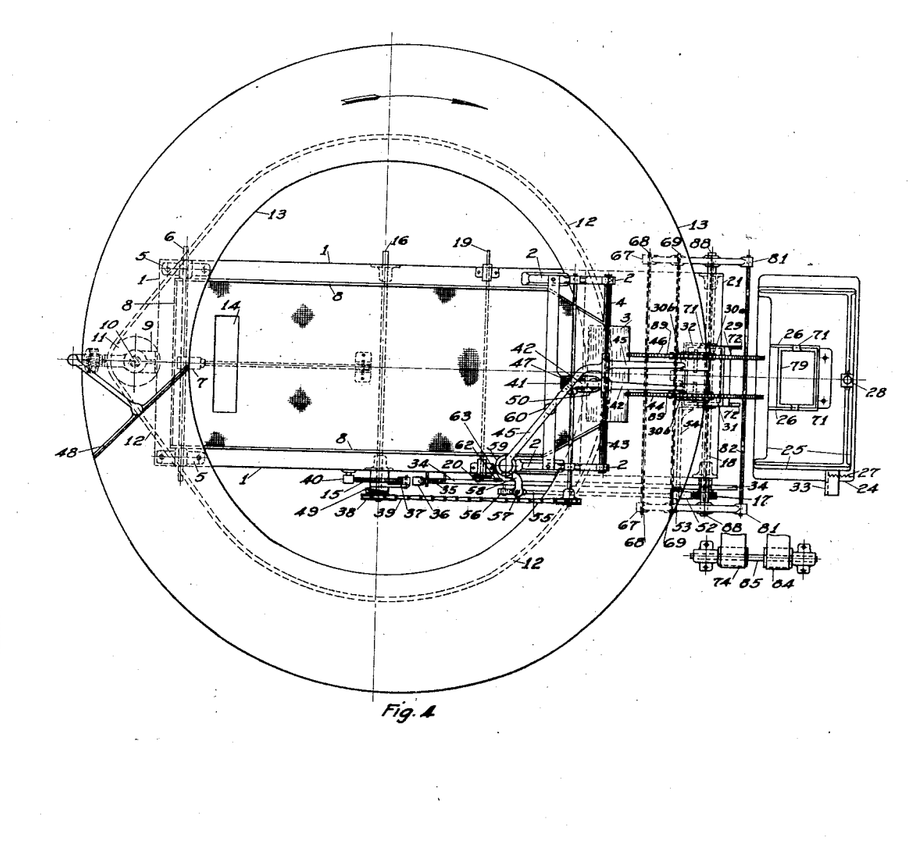
Fig. 4 is a top plan view of the machine of Fig. 1.
Figure 5:
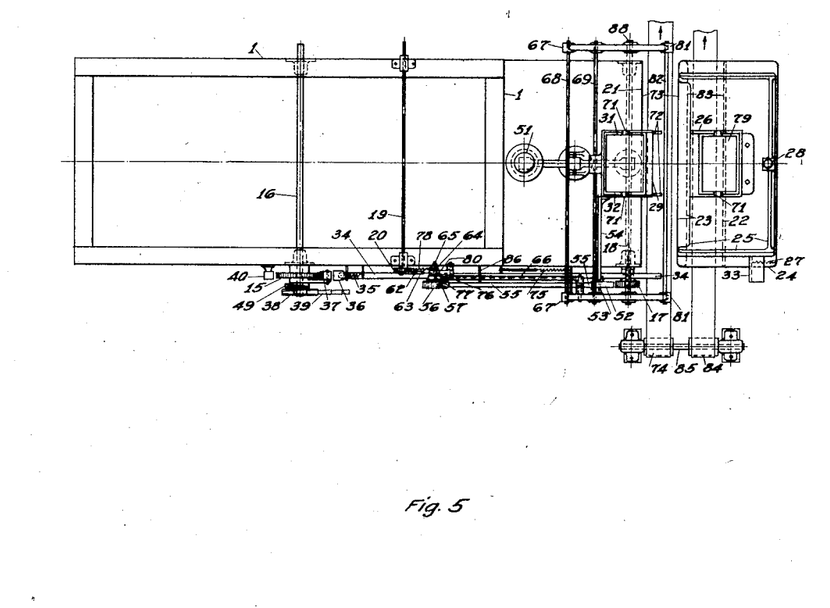
Fig. 5 is a plan section of Fig. 1 on the line V—V thereof.
Figure 6:
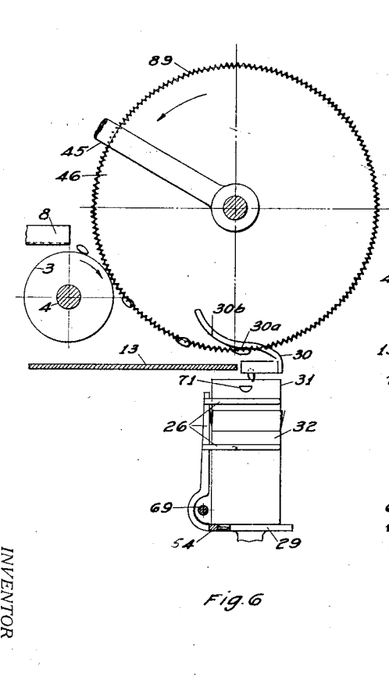
Fig. 6 is a side detail of the picker wheels and stripper in the position of filling cartons.
Figure 7:
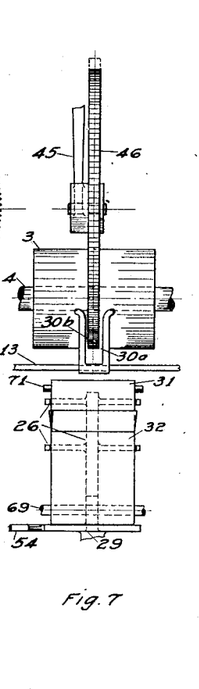
Fig. 7 is an end view of Figs. 6 and 8.
Figure 8:
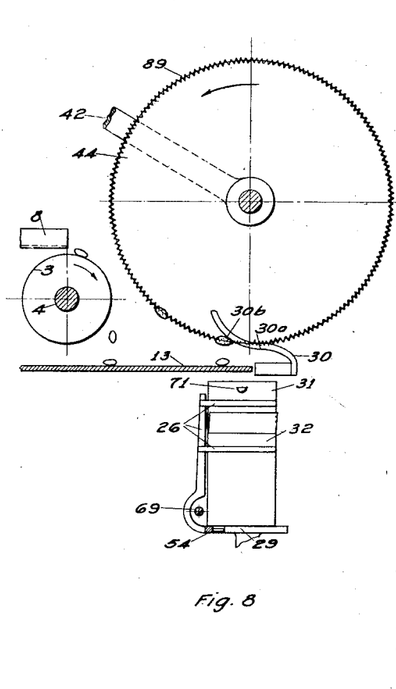
Fig. 8 is similar to Fig. 6, but indicating the position of the parts after the carton is filled and the wheels raised.

The principal parts of the machine are mounted upon the base indicated by the numeral 1 carrying the brackets 2, 2, on which is mounted the feed roller 3, carried on the shaft 4. The bracket 5 supports the shaft 6 and eccentric 7, for shaking the feed table 8, in the usual well known way. The said table 8 is suitably supported from flexible links or any other well known means. A bracket 9 supports the shaft 10 and sheave 11 which drives an annular rotatable table 13, 13, 13 which is here shown in the form of a saucer shaped ring by the rope 12 and which is substantially level in that portion below the feed roller 3. It is to be understood that this table is suitably supported in bearings or otherwise from the base 1 so that it may be freely rotated by the cable 12 actuated from the shaft 10 and at a suitable speed, the shaking table 8 is located within the annular opening of the said table. The chute 14 is connected with any suitable supply of material to be packed, as raisins, which fall therethrough on to the shaking table 8, and by the shaking movement the raisins are caused to travel on to the feed roller 3. The ratchet wheel 15 is caused to continuously revolve loosely upon the shaft 16 and the ratchet wheel 17 is mounted on and revolves with the shaft 18. Mounted upon the shaft 19 is the crank 20; shafts 10, 6, 85, 19, 4, 18 and ratchet 15, are continually rotated at suitable speeds in any well known way from a source of power not shown. Mounted in connection with the base 1 is the frame work 21, 22, and division member 23 and table support 24. Mounted upon the table 24 is the charging mechanism comprising the table 25 and container rack 26, 26, 26. The table 25 is normally held in the position shown in the figure by the spring 27 and is operable laterally by the finger member 28 whereby it may be advanced towards the scale platform 29 either automatically or by hand at which time the table 25 approaches close to the platform 29, and the rack 26 thereafter travels over the table 25 forcing the made up container and funnel as indicated at 79, which have previously been set in place into its charging position on the platform 29 under the stripping mechanism 30 so that raisins being stripped by the member 30 and at the point $30^a$ are caused to fall by gravity into the container located on the platform 29. In the illustration see Fig. 3, 31 indicates a metal funnel which I prefer to insert within the opening of the container 32, and I prefer to employ said funnel 31 having a contour enabling it to just slip within the container, and wrap around the said funnel a sheet of paraffine paper or the like, which remains in place within the container after the funnel has been removed as described below, thus providing a lining within the container as required in some instances. In some cases the funnel may be dispensed with according to the requirements of the package and the contents being placed therein.

At 33 is shown an arm adapted to engage the push rod 34 provided with spring 35 and trip 36, the latter adapted to force the pawl 37 into engagement with the ratchet 15 whenever the table 25 forces a container on to the scale platform 29. Mounted on the shaft 16 is the chain wheel 38 which is in engagement with the arm carrying the pawl 37 or other suitable clutch mechanism. When the trip 36 is actuated from the push rod 34 the chain 39 is picked up by the ratchet 15 and caused to rotate until pawl 37 or its equivalent clutch is disengaged as by the trip 40 which latter I prefer to make adjustable in any well known way so as to cause the chain 39 to travel a definite predetermined amount before its movement is disengaged from the said ratchet 15, and when the chain 39 rotates it carries with it cam member 41 which cam raises the lever of the first order 42 fulcrumed at 43 and carrying on its opposite end the primary picker member 44 which is provided with suitable teeth or fingers 89 adapted to engage the raisins or other units of material to be packed in the containers. There is also fulcrumed at 43 and supported from the arm 2 a second lever of the first order 45 on the opposite end of which is a similar picker member 46 parallel with 44 and similar in construction thereto. It is to be understood that 44 and 46 lie substantially parallel and close together and both or either may contact with and rotate with the feed roll 3, depending upon the position of the arms 42, 45. When arm 42 is raised through the action of the cam 41 it engages arm 45 through the lug 47 thereby throwing both picker members 44 and 46 into rotating contact or proximity to feeder roll 3 at which time material being shaken from the table 8 on to the roll 3 is caught upon the fingers or teeth of picker members 44 and 46 and carried thereby to the stripper 30 when the said material is stripped from the members and falls through the funnel 31 and into the container 32. It is to be noted that this stripping occurs from either or both members at the point marked $30^a$, when the wheels are in their lower position 46 and that when either or both of the said wheels are raised into the position indicated at 44 the stripping will take place at the point marked $30^b$; in the first instance, namely, at $30^a$ the material will fall into the container; but when the members are raised the material will fall from the point $30^b$ on to the rotating table 13 and be thereby returned to the opposite end of the shaking table and at such time will be scraped therefrom by the scraper 48 back on to the shaking table 8.

When the pawl or clutch mechanism 37 has rotated the predetermined amount through the action of the ratchet 15 and has been tripped out of engagement by 40, means are provided as indicated diagrammatically by the weight 49 to cause the pawl 37 to return to its initial position returning at the same time the chain 39 and cam 41 to their initial positions all as shown in Fig. 1. At such time the arm 42 is drawn down by the spring 50, coincidentally raising the member 44, after which any raisins still remaining thereon are caused to fall from the point 30$^b$ on to the table 13 as above described. The precision wheel or picker member 46 is, however, still picking up raisins from the roll 3 and carrying them against the stripper 30 at the point 30$^a$, and therefore is continuing to add material to the container. The container is now approaching its final weight, which when sufficient to counterbalance the predetermined weight 51 causes the scale platform 29 to move downward carrying with it the freely suspended pawl 52 which now engages with the teeth of the ratchet wheel 17. This pawl freely swings about the pivot 53 which is held against lateral movement by its suspension arm 54 and when it connects with the teeth of the ratchet 17 it is carried back against the bumper 55 which through the bell crank 56 and connecting rod 57 actuates the latch 58 to release the trigger 59; permitting the spring 60 to draw the arm 45 downward and disengaging the picker member 46 from the roll 3, thus causing any raisins that may be carried thereon to thereafter fall from the point 30$^b$ on to the table 13 and away from the container. It will be observed that the members 44 and 46 are rotated through frictional engagement with the roll 3, or the material contained on the roll 3 and being carried thereby, and it is not necessary to independently rotate them. When the trigger 59 is released from the latch 58 it compresses the spring 61, depressing the arm 62 which carries upon its lower end a fulcrum for the rocking arm 63. One end of the said rocking arm is actuated by the crank 20 so that the said arm 63 has a reciprocating movement clear above the end of the lever 64 except when the rod 62 is depressed with the trigger 59; at which time the end of the reciprocating rod 63 engages the lever 64, which latter is pivoted at 65, forcing the connecting rod 66 to the right, causing the discharge rod 67 carrying the rollers 68 and 69 to swing to the right and force the container 32 with its inserted funnel 31 clear of the platform 29, and permitting them to drop freely through the opening and in the direction of the arrow 70. During this drop the lugs 71 on the side of the funnel are caught on each side by the projections 72 when the container 32, due to its inertia falls into the pocket 73 free from the said funnel and the latter now remains suspended upon the projections 72, see also Fig. 2. The traveling belt 74 now carries the container to any point desired. In the packing of such material as raisins the falling of the container from the platform 29 on to the belt 74 provides the necessary force to compact the material to a suitable degree for the finished package. The arm 67 is shown in the position of discharge by dotted lines in Fig. 2 at which time it will be noted that the spring 75 and the lever 64 is now held by the latch 76 engaging the pin 77, and the spring 78 is under tension. The apparatus is now ready for recharging. The finger member 28, table 25 and frame 26 on which has been set the container 79 about to be packed is forced in a direction towards the left until the frame 26 has pushed the container 79 from the table 25 on to the platform 29 and has at the same time caused the arm 33 to actuate the push rod 34 which in turn has caused the movement of the chain 39, the rotation of the cam 41 and the lifting of the arms 42, 45, as previously described. The members 44 and 46 are thus caused to roll in contact with the roll 3 and begin to pick up raisins to be introduced into the new container 79 which has taken the position 32. When the arm 45 has been raised as described the spring 61 is released from the trigger 59 and the rod 62 is thereby raised carrying with it the reciprocating member 63 which now engages the trigger 80 which releases the latch 76 from the pin 77 when the springs 78 withdraw the arm 64 to its full line positions shown in Fig. 1. This movement is very rapid so that the container 79 may slide freely on to the platform 29 as the rollers 69 and 68 are withdrawing into their full line positions. During the return movement of the arm 67 its lower end 81 carrying the roller 82 swings to the right forcing the funnel heretofore suspended from the lugs 72 to the right and into the chute 83 and upon the conveyor 84 by which it is carried to a table for replacement in other cartons to be subsequently placed upon the charging table 25.

Figure 9:
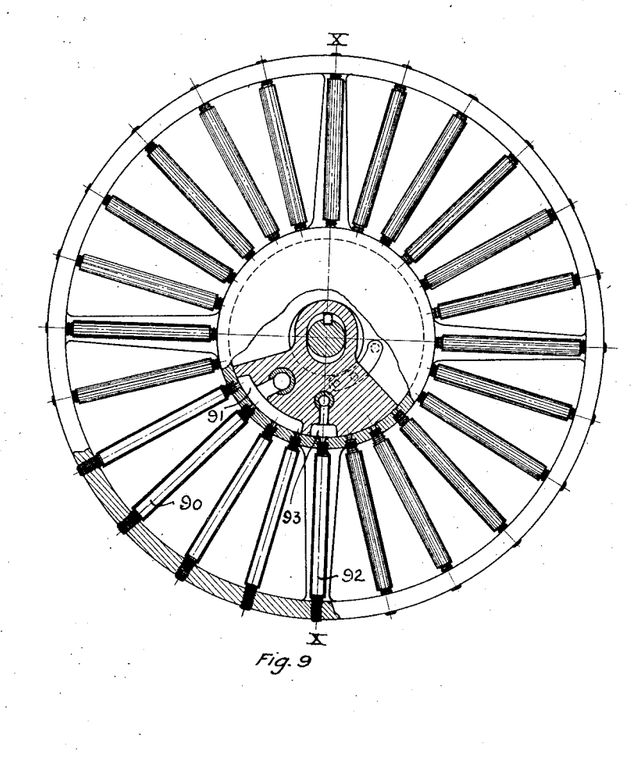
Fig. 9 is a side view of an alternate form of picker wheel adapted to pick the raisins up by suction.
Figure 10:
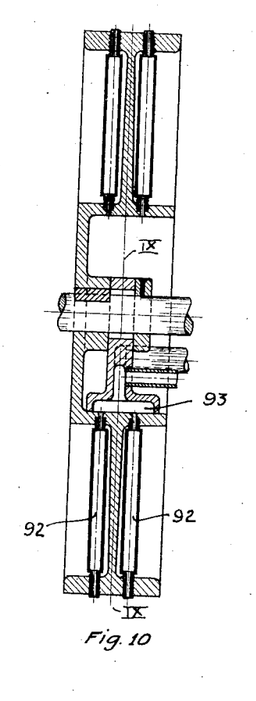
Fig. 10 is an end view of Fig. 9.

The discharge lever 81 is shown pivoted at 88 and the disc members 46, 44, are provided with serrated edges or teeth as at 89 but other forms of pickers may be employed such for example as suction projections wherein an indraft of air will hold the material against the pickers. Such a wheel is shown in Figs. 9, 10, wherein the tubular arms 90 register with the suction port 91 as the wheel rotates, an indraft of air through said arms then catches up and holds raisins at their ends or mouths; as the arms rotate to position at 92 they register with the outdraft port 93, when the raisins are blown away from the mouths of the arms or tubes. As the wheels are raised when a carton is filled the ports 91 and 93 may be rotated so that the points on the outer edge where the outdraft occurs will be further to the left of Fig. 9 in such case and with same material the stripper 30 will be unnecessary. The air compressor connections to ports 91 and 93 are not shown but are well known in the art.

A special feature of my machine is the manner in which the container is packed by the action of a plurality of pickers until the final weight is nearly reached when the number of pickers in action is automatically reduced, after which the packing proceeds at a retarded rate until the final weight is exactly reached when the remaining picking is automatically stopped.

In the example of my invention set forth in the drawings and description above, I have selected but one form for illustration, and in which but one container is filled at a time, but it will be apparent that a plurality of containers may be packed and weighed by duplicating certain parts of the mechanism without duplicating all of the parts, as for example a single shaking table and feeding roll may be employed with several sets of scales and picking devices and such number of containers individually weighed and packed by such apparatus and each one brought to a correct final weight when its charging mechanism is automatically cut out and the packed containers may be thereafter discharged separately or simultaneously from the apparatus which is then ready for a further group of empty containers to be packed and weighed.

I claim:

1. In packing and weighing mechanism a shaking table adapted to distribute material to be packed over a feeding means, feeding means adapted to receive and to carry said material in segregated condition, a plurality of picking members by which the material may be picked up and transferred and movable supporting means therefor constructed and adapted to permit either or all of said members to move to or from contact with said material on said feeding means, and a stripping device adjacent each member by which the transferred material is freed therefrom.

2. In packing and weighing mechanism a shaking table adapted to distribute material to be packed over a feeding means, feeding means adapted to receive and to carry said material in segregated condition, a plurality of picking members constructed and adapted to pick up and transfer the material and movable supporting means therefor constructed and adapted to permit either or all of said members to move to or from contact with said material on said feeding means, and a stripper adjacent each member by which the transferred material is freed therefrom and falls into a container or outside of said container depending on the position of the said supporting means.

3. In packing and weighing mechanism a shaking table adapted to distribute material to be packed over a feeding means, feeding means adapted to receive and to carry said material in segregated condition, a plurality of picking members constructed and adapted to pick up and transfer the material and movable supporting means therefor constructed and adapted to permit either or all of said members to move to or from contact with said material on said feeding means, and a stripper adjacent each member by which the transferred material is freed therefrom and falls into a container or outside of said container depending on the position of the said supporting means, scale means on which said container is adapted to rest while receiving said material, mechanism under control of the scale and adapted to actuate the supporting means to interrupt the packing of material thus reducing the rate at which material is being stripped into the container.

4. In packing and weighing mechanism a shaking table adapted to distribute material to be packed over a feeding means, feeding means adapted to receive and to carry said material in segregated condition, a plurality of picking members by which the material may be picked up and transferred and movable supporting means therefor constructed and adapted to permit either or all of said members to move to or from contact with said material on said feeding means, and a stripping device adjacent each member by which the transferred material is freed therefrom and falls into a container or outside of said container depending on the position of the said supporting means, scale means on which said container is adapted to rest while receiving said material, mechanism automatically actuating certain supporting means to interrupt the packing of material thus reducing the rate at which material is being stripped into the container and tripping mechanism actuated by said scale to release the last of the supporting means and its picking member from contact with the said material only when the container and material has reached a predetermined weight.

5. In packing and weighing mechanism a shaking table adapted to distribute material to be packed over a feeding means, feeding means adapted to receive and to carry said material in segregated condition, a plurality of picking members by which the material may be picked up and transferred and movable supporting means therefor constructed and adapted to permit either or all of said members to move to or from contact with said material on said feeding means, and a stripping device adjacent each member by which the transferred material is freed therefrom and falls into a container or outside of said container depending on the position of the said supporting means, scale means on which said container is adapted to rest while receiving said material, mechanism under control of the scale and adapted to actuate the supporting means to interrupt the packing of material thus reducing the rate at which material is being stripped into the container and tripping mechanism actuated by said scale to release the last of the supporting means and its picking member from contact with the said material only when the container and material has reached a predetermined weight; discharge means released by said tripping mechanism and by which said scale is cleared of the weighed and packed container.

6. In packing and weighing mechanism a shaking table adapted to distribute material to be packed over a feeding means, feeding means adapted to receive and to carry said material in segregated condition, a plurality of picking members constructed and adapted to pick up and transfer the material and movable supporting means therefor constructed and adapted to permit either or all of said members to move to or from contact with said material on said feeding means, and a stripper adjacent each member by which the transferred material is freed therefrom and falls into a container or outside of said container depending on the position of the said supporting means and a traveling table positioned and adapted to receive said stripped material which falls outside of said container and transfers the same to a position to be again passed over said feeding member.

7. Weighing and packing mechanism as set forth in claim 6 wherein the picking members are of circular form adapted to roll against the said feeding means which is of cylindrical form, or to be raised free therefrom by said supporting means.

8. Weighing and packing mechanism as set forth in claim 6 wherein the picking members are of circular form adapted to roll against the said feeding means or to be raised free therefrom by said supporting means; scale means on which said container is adapted to rest while receiving said material.

9. Weighing and packing mechanism as set forth in claim 6 wherein the picking members are of circular form adapted to receive rotary motion from the said feeding means, or to be raised free therefrom by said supporting means; scale means on which said container is adapted to rest while receiving said material and tripping mechanism actuated by said scale to release the last of the picking members from contact with the said material only when the container and material has reached a predetermined weight.

10. Weighing and packing mechanism as set forth in claim 6 wherein the picking members are of circular form adapted to receive rotary motion from the said feeding means or to be raised free therefrom by said supporting means; scale means on which said container is adapted to rest while receiving said material and tripping mechanism actuated by said scale to release the last of the supporting means and its picking member from contact with the said material only when the container and material has reached a predetermined weight; discharge means released by said tripping mechanism and by which said scale is cleared of the weighed and packed container.

11. Weighing and packing mechanism as set forth in claim 6 wherein the picking members are of circular form adapted to receive rotary motion from the said feeding means, or to be raised free therefrom by said supporting means; scale means on which said container is adapted to rest while receiving said material and tripping mechanism actuated by said scale to release the last picking member from contact with the said material only when the container and material has reached a predetermined weight; discharge means released by said tripping mechanism and by which said scale is cleared of the weighed and packed container and a discharge chute adjacent said scale means adapted to receive said discharge container, and transfer means therein whereby said container is adapted to be moved clear of the mechanism.

12. Weighing and packing mechanism as set forth in claim 6 wherein the picking members are of circular form adapted to receive rotary motion from the said feeding means, or to be raised free therefrom by said supporting means; scale means on which said container is adapted to rest while receiving said material and tripping mechanism actuated by said scale to release the last picking member from contact with the said material only when the container and material has reached a predetermined weight; discharge means released by said tripping mechanism and by which said scale is cleared of the weighed and packed container and a discharge chute adjacent said scale means adapted to receive said discharged container, and transfer means therein whereby said container is adapted to be moved clear of the mechanism, and a charging table adapted to slide across said chute and transfer means slidable with respect to said table whereby an empty container may be transferred to the scale means ready to be packed.

13. Weighing and packing mechanism as set forth in claim 6 wherein the picking members are of circular form adapted to receive rotary motion from the said feeding means or to be raised free therefrom by said supporting means; scale means on which said container is adapted to rest while receiving said material and tripping mechanism actuated by said scale to release the last of the supporting means and its picking member from contact with the said material only when the container and material has reached a predetermined weight; discharge means released by said tripping mechanism and by which said scale is cleared of the weighed and packed container into a chute, said chute and transfer means therein by which the packed container is moved clear of the mechanism.

14. Weighing and packing mechanism as set forth in claim 6 wherein the picking members are of circular form adapted to receive rotary motion from the said feeding means or to be raised free therefrom by said supporting means; scale means on which said container is adapted to rest while receiving said material and tripping mechanism actuated by said scale to release the last of the supporting means and its picking member from contact with the said material only when the container and material has reached a predetermined weight; discharge means released by said tripping mechanism and by which said scale is cleared of the weighed and packed container into a chute, said chute and transfer means therein by which the packed container is moved clear of the mechanism, and a charging table and transfer means adapted to transfer empty containers across said chute and onto said scale means.

DAVID W. RIPLEY.